(12) United States Patent
Craig

(10) Patent No.: US 6,394,267 B1
(45) Date of Patent: May 28, 2002

(54) RETURNABLE GASKET RACK

(75) Inventor: Brandon J. Craig, Greensburg, PA (US)

(73) Assignee: Menasha Corporation, Neenah, WI (US)

( * ) Notice: Subject to any disclaimer, the term of this patent is extended or adjusted under 35 U.S.C. 154(b) by 25 days.

(21) Appl. No.: 09/688,675

(22) Filed: Oct. 16, 2000

(51) Int. Cl.⁷ .............................................. B65D 85/30
(52) U.S. Cl. ...................... 206/321; 206/499; 211/13.1; 211/193
(58) Field of Search .................. 206/449, 320, 206/321; 211/13.1, 49.1, 190, 193, 207

(56) References Cited

U.S. PATENT DOCUMENTS

| 3,602,374 A | * | 8/1971 | Alabaster | 211/193 |
| 3,817,443 A | * | 6/1974 | Miller | 206/320 |
| 3,872,969 A | * | 3/1975 | Jean | 206/320 |
| 4,938,358 A | * | 7/1990 | Johansen | 206/499 |
| 5,018,629 A | * | 5/1991 | Lamar | 211/49.1 |
| 5,918,750 A | * | 7/1999 | Jackson | 211/189 |
| 6,093,228 A | * | 3/2000 | Stein et al. | 224/532 |

* cited by examiner

Primary Examiner—David T. Fidei
(74) Attorney, Agent, or Firm—Quarles & Brady LLP

(57) ABSTRACT

A reusable and returnable gasket rack supports gaskets during shipping and storage. The gasket rack includes a framework having a rectangular base joined to a parallel top at its corners by four perpendicular uprights. Two sets of two gasket supports spaced apart in parallel planes are mounted to the framework. Each gasket support has an upright extending perpendicularly from the base and a cross-member attached at a free end of the upright to be substantially parallel to the base. Support bars extend perpendicularly between the cross-members of each set of gasket supports and planar gasket rests lying upon the support bars. The gasket supports are sized and positioned so that one or more gaskets can be supported at top and bottom ends to prevent the gaskets from deforming or breaking. The rack is adjustable to accommodate various sized gaskets and can be disassembled into a compact package for return shipment.

26 Claims, 5 Drawing Sheets

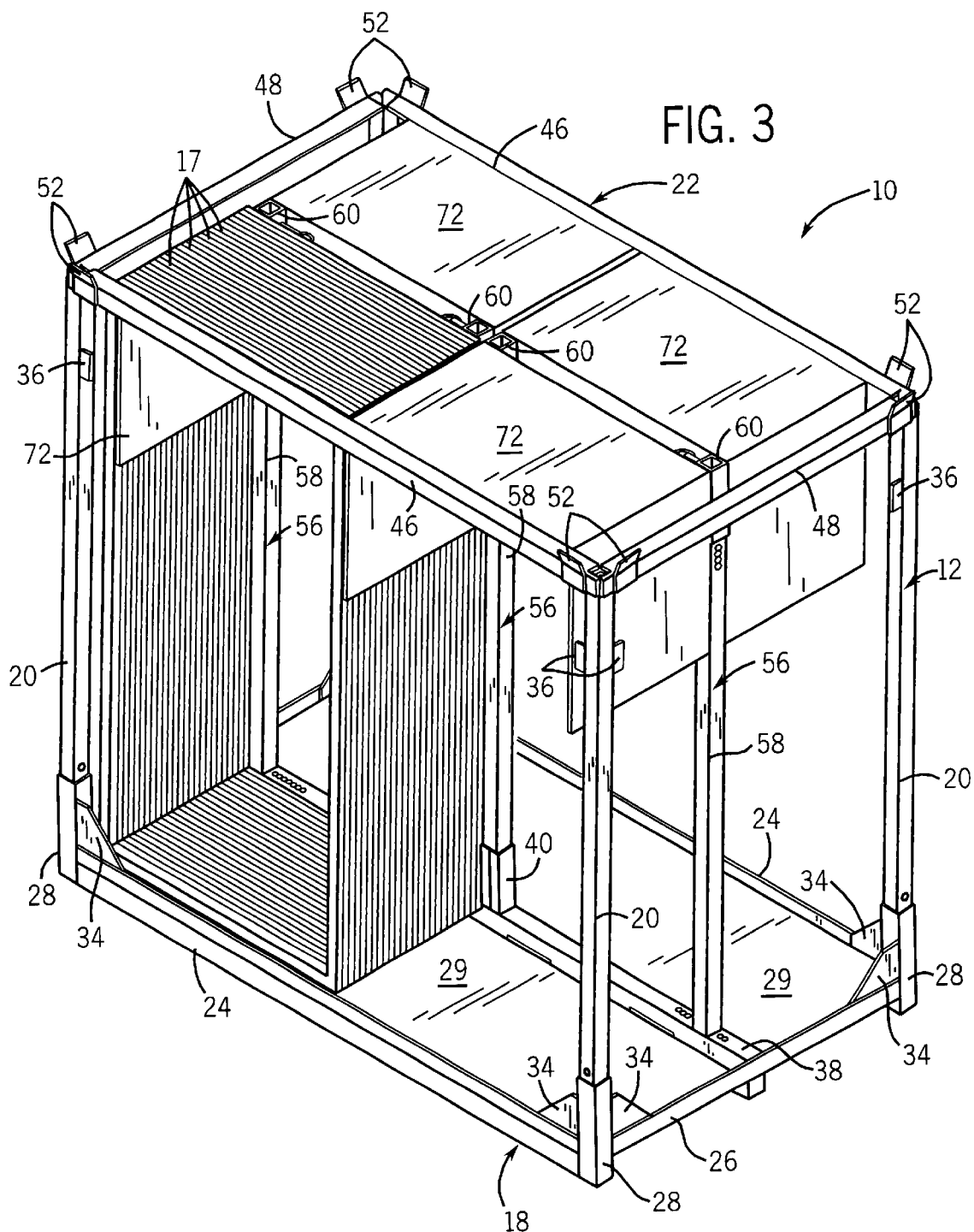

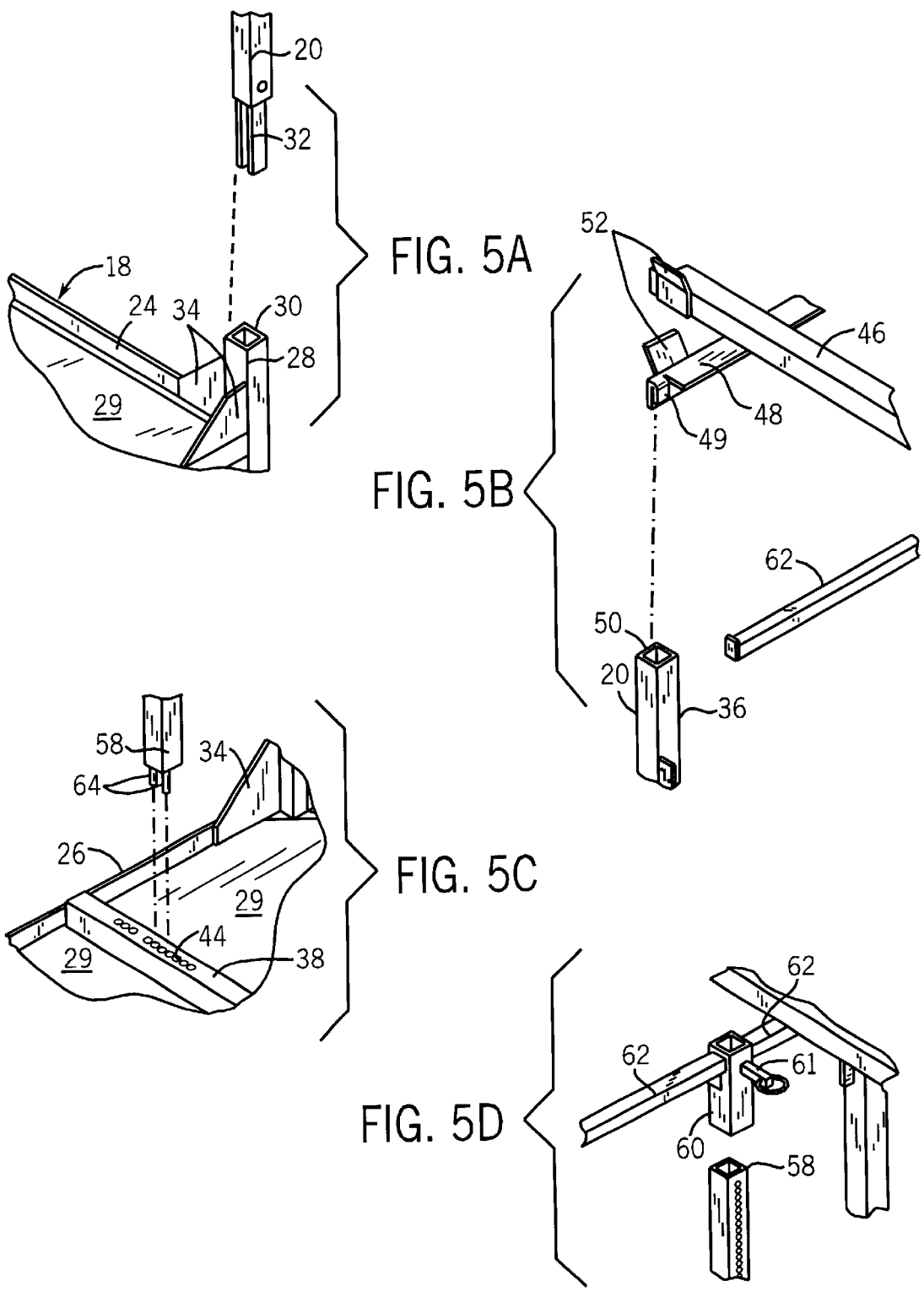

RETURNABLE GASKET RACK

CROSS-REFERENCE TO RELATED APPLICATIONS (Not applicable)

STATEMENT REGARDING FEDERALLY SPONSORED RESEARCH/DEVELOPMENT (Not applicable)

BACKGROUND OF THE INVENTION

The present invention relates generally to a rack for supporting objects and in particular to a rack for supporting one-piece gaskets during shipping, storage and display.

Elongated, one-piece gaskets are commonly found in such items as stoves, refrigerators, caskets and vehicles. Ordinarily, the gaskets are shipped in bulk from the gasket manufacturer to the facility where they will be incorporated into another product or resold on a support rack or in a box. This is because the gaskets are made to follow a specific path defined by the product in which it is used. Moreover, refrigerator gaskets, for example, are often made of an extruded polypropylene with a magnetic core. Such gaskets, in particular, can deform under their own weight during shipping and storage if not properly supported, particularly during extreme heat. A gasket that is sufficiently deformed so that it no longer follows the intended path is not usable. Also, the gaskets are shipped or stored in extreme cold, they may become brittle and break if not properly supported, which also renders the gasket unusable.

The support racks must be sufficiently sturdy to support a number of gaskets and as such are often made of steel tubing or caging. These racks are sufficiently costly that they are usually returned to the manufacturer after the gaskets have been sold and then reused. Since the size and configuration of the gaskets varies for different products, often a special rack has to be constructed for each gasket type and size to properly support the gaskets, which increases costs. Less expensive support racks can be made of corrugated paper or plastic that are designed to be discarded after use. However, such racks still must be made for each type and size of gasket. Moreover, unless they are recycled, discarding these racks increases the refuse produced by the service facility or consumer.

Accordingly, an improved rack for supporting gaskets in storage, transit and display is needed.

SUMMARY OF THE INVENTION

The present invention provides a rack designed to properly support gaskets, such as those commonly used in home appliances, during shipping, storage and/or display so that they do not deform or break. Specifically, the present invention includes a framework having a base and a substantially parallel top joined together by at least two perpendicular uprights. To the framework are mounted a pair of gasket supports spaced apart in parallel planes. Each gasket support has an upright extending perpendicularly from the base and a cross-member attached at a free end of the upright to be substantially parallel to the base. The gasket supports are sized and positioned so that a gasket can be supported at its top and bottom.

Thus, the present invention provides a gasket rack which supports the gaskets properly to reduce damage or deformation to the gaskets during shipping and storage. The gasket rack is sufficiently robust to be shipped back to the gasket manufacturer or distributor for reuse.

One aspect of the invention is that it can be disassembled and configured into a compact package when not supporting gaskets. As such, when the gasket rack is empty it can be disassembled to occupy less space for shipping and storage.

In one preferred form of the invention, the rack has framework with a rectangular base joined at its corners to a rectangular top by four perpendicular uprights. Two sets of two laterally spaced gasket supports are mounted to the frame.

The gasket supports each have an upright mounted to the base and connected to a cross-member. Support bars extend perpendicularly between the cross-members of each set of gasket supports upon which rest planar support members. The gasket supports are sized and positioned so that both the upper and lower ends of a gasket can be supported.

In the preferred embodiment, the framework includes four uprights and the framework top and base have a pair of parallel lateral members and a pair of parallel transverse members joined to the uprights at their ends. The longitudinal and lateral members have flanges at their ends sized to fit within an opening of the framework uprights. The gasket supports are longitudinally and laterally adjustable to accommodate various sizes of gaskets. Each includes a collar connected to a pair of cross-members. The collar can be slid along the length of the upright to the desired height. The collar includes a removable pin sized to fit within one of a plurality of longitudinally spaced holes in the gasket support upright for securing cross-members to the upright.

The preferred embodiment of the gasket rack has two sets of two gasket supports. Also, the base includes a center brace having a pair of fixed upright receptors sized to receive a connection end of a gasket support upright from each of the two sets. The center brace also has at two locations a plurality of holes spaced apart laterally in which are disposed a pair of pins at the bottom end of the remaining two gasket support uprights.

The preferred gasket rack also includes one or more support bars extending between the cross-members of each set of gasket supports. The support bars hold up a planar gasket rest which supports the top legs of the gaskets. The support bars are adjustable and include complementary members in sliding relation to each other that can be held fixed by a thumb screw fastener. The support bars have bent ends that fit over and engage with the cross-members to hold them in place.

The preferred gasket also includes side panels and a top cap for enclosing the gaskets within the framework. Tabs welded to the framework uprights retain the side panels. Tabs extending upwardly and outwardly from the top of the framework aid in stacking of the racks one on top of another.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 3 is a perspective view of the gasket rack without the side panels showing gaskets being supported;

FIG. 5A is a enlarged view of region A of FIG. 5;

FIG. 5B is an enlarged view of region B of FIG. 5;

FIG. 5C is an enlarged view of region C of FIG. 5;

FIG. 5D is an enlarged view of region D of FIG. 5; and

DETAILED DESCRIPTION OF THE PREFERRED EMBODIMENT

Figure 1:
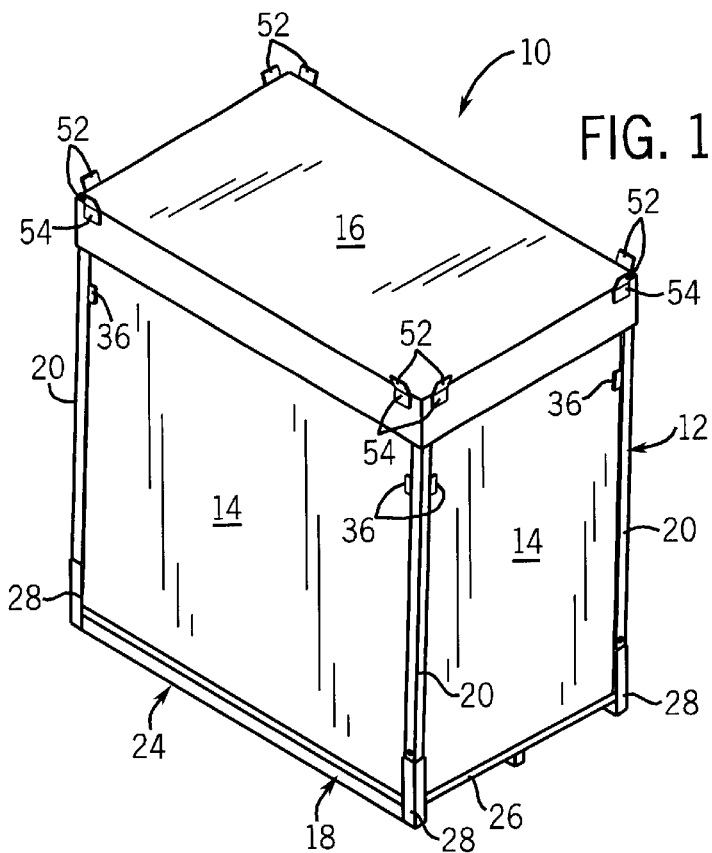
FIG. 1 is a perspective view of a gasket rack of the present invention shown enclosed by a cap and side panels and assembled for shipping gaskets from the manufacturer.
Figure 2:
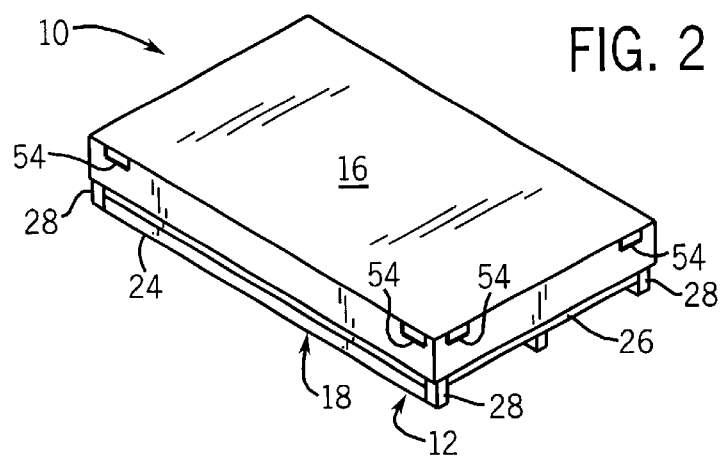
FIG. 2 is a perspective view of the gasket rack of FIG. 1 shown empty and unassembled for return shipment of the rack.

The gasket rack of the present invention is referred to generally throughout the drawings by reference numeral 10. Referring to FIG. 1, the gasket rack 10 includes a steel framework 12 forming a parallelepiped structure enclosed by corrugated paperboard side panels 14 and a corrugated paperboard cap 16. The gasket rack 10 is as shown in FIG. 1 when assembled for shipping, storing and/or displaying gaskets 17 (see FIG. 3). Referring to FIG. 2, the gasket rack 10 can be disassembled and configured into a compact package roughly ⅙ the assembled size for storage or when returning them to the gasket manufacturer or distributor for reuse.

Figure 4:
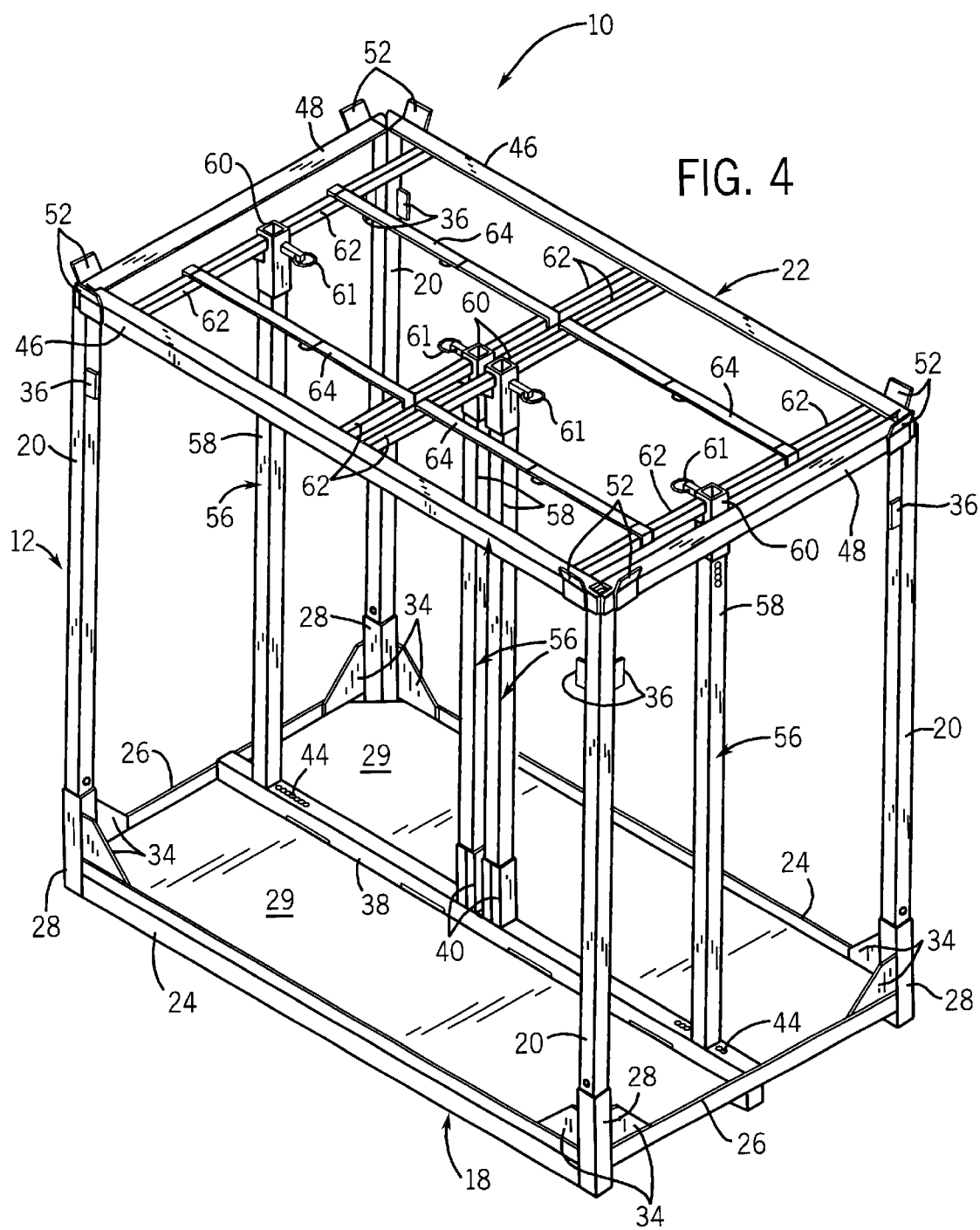
FIG. 4 is a perspective view similar to FIG. 3 without gaskets or planar gasket rests.
Figure 5:
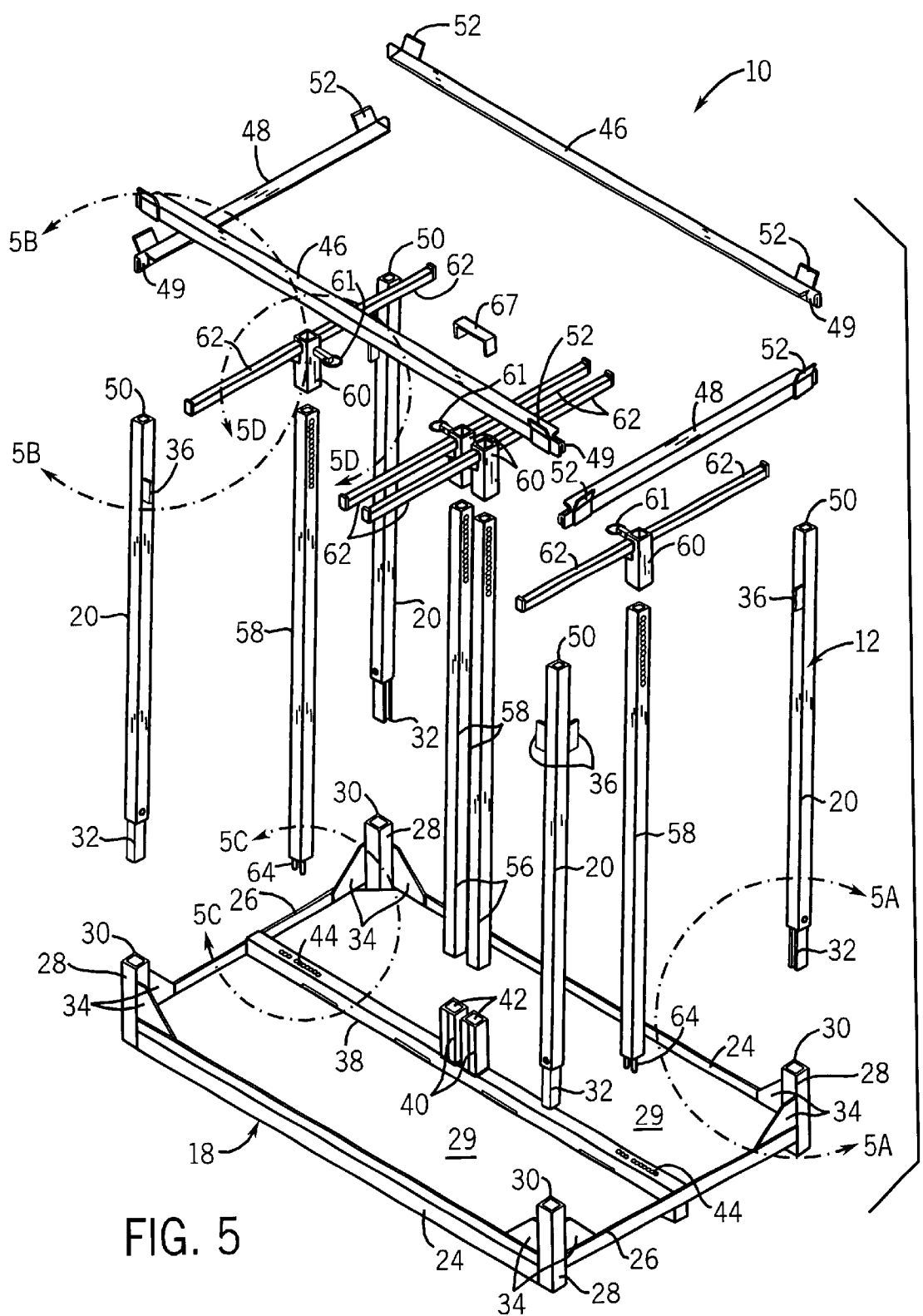
FIG. 5 is an exploded view of the gasket rack without lateral support bars.

FIGS. 3–5 show the gasket rack 10 without the side panels 14 and cap 16. The framework 12 includes a rectangular base 18, corner uprights 20 and a top frame 22. The base 18 is formed of two lateral members 24 connected, for example by welding, to two transverse members 26 at corner receptors 28 and spanned by two sheet steel bottom panels 29. The corner receptors 28 have longitudinal openings 30 into which fit a connection end 32 of the corner uprights 20, the connection end 32 being a U-channel of decreased dimension (see FIG. 5A). Angled gussets 34 are connected at the corners for supporting the receptors 28. The angled gussets 34 also work in conjunction with tabs 36 extending laterally and transversely from the corner uprights 20 to retain the side panels 14 (see FIG. 1).

The base 18 also includes a lateral center brace 38 which is connected (e.g. welded) to the two transverse members 26 between the lateral members 24. The center brace 38 includes two centrally located fixed upright receptors 40 having longitudinal openings 42. The two upright receptors 40 are spaced apart slightly from the lateral centerline of the center brace 38. The center brace 38 also includes a plurality of holes 44 spaced apart laterally near its outer ends.

The top frame 22 is formed of two L-shaped lateral members 46 and two L-shaped transverse members 48 both of which have longitudinal flanges 49 cut out from their top flanges and bent down so as to be inserted into openings 50 of the corner uprights 20 to unite the top frame 22 with the rest of the framework 12 (see FIG. 5B). The lateral 46 and transverse 48 members also include upwardly extending tabs 52 at each end. The tabs 52 fit into die cut slots 54 of the corrugated cap 16 to hold it in place (see FIG. 1). The tabs 52 also extend outwardly to align the base of another gasket rack stacked thereon.

The framework 12 provides a structure for mounting two pairs of gasket supports 56. Each gasket support 56 includes an upright 58, an adjustment collar 60 and a cross-member 62. A bottom end of the inner two uprights 58 are inserted into the upright receptacles 40 along the center brace 38 of the base 18. As shown in FIG. 5C, the outer two uprights 58 have a pair of longitudinal pins 64 at a bottom end that are inserted into a pair of the holes 44 in the base center brace 38. The ends of each cross member 62 are received under the top flanges of the lateral members 46 and inside of the side flanges of the lateral members 46.

Referring to FIGS. 5 and 5D, the adjustment collar 60 is integrally connected centrally to the cross-member 62 and has a hollow center so that the adjustment collar 60 can fit over the top end of each upright 58. The collar 60 includes a hole at one lateral side in which a pin 61 can be removably inserted. The collar 60 is slid up and/or down along the gasket support upright 58 until the desired height is reached and the pin 61 engages one of a plurality of openings spaced longitudinally at a lateral side of the upright 58. Each pair of gasket supports 56 are independently adjustable to accommodate different sized gaskets 17.

Figure 6:
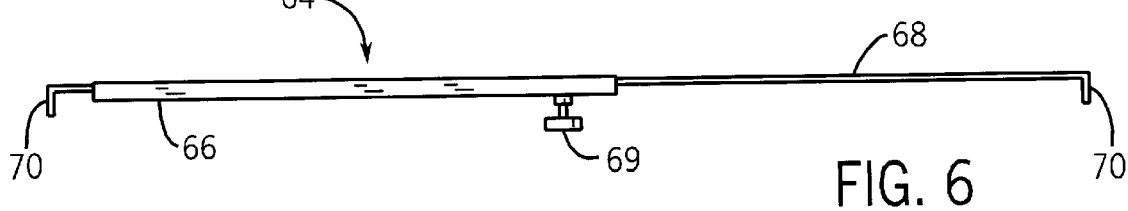
FIG. 6 is a side plan view of a lateral support bar.

Two adjustable support bars 64 extend laterally between the cross-members 62 of each pair of gasket supports 56. Referring to FIG. 6, the support bars 64 are comprised of a channel member 66 and an elongated planar member 68 that is slidable within the channel member 66. The channel member 66 includes a threaded bore in which is threaded a thumbscrew 69. The shaft of the thumbscrew extends through the bore and abuts the planar member 68 so as to fix its position with respect to the channel member 66. Outer ends 70 of the channel and planar members are bent downward to catch outer sides of the two cross-members 62 in each pair of gasket supports 56. The support bars 64 can be secured in place by adjusting them so that the bent ends 70 are tensioned against the cross-members 56 in opposing directions. A U-clip 67 can be fit into openings in the inner two gasket support uprights 58 to tie both sets of gasket supports 56 together and increase the integrity of the rack.

Planar gasket rests 72, which may be corrugated paperboard, lay upon the support bars 64 to provide a larger area of support for the upper leg of the gaskets 17. In this configuration, the gasket supports 56 define four hanging locations, two defined by each pair of gasket supports 56. In FIG. 3, only one hanging location is shown loaded with gaskets 17, the other three locations being shown provided with only the rests 72.

For shipping and storage, the gasket rack 10 is preferably filled with one or two sizes of one-piece, usually rectangular, gaskets 17. The side panels 14 and cap 16 can be left on for storage to shelter the gaskets 17 or removed for display. When the gasket rack 10 is emptied, the corner uprights 20, top frame 22, gasket supports 56, adjustable support bars 64 and gasket rests 72 can be disassembled. These components and the side panels 14 can then be laid within the base 18 and capped by the cap 16. In this position the gasket rack 10 is reduced to approximately ⅙ that of the assembled size, allowing it to be compactly stored or shipped back to the gasket manufacturer or distributor for reuse.

In a preferred form, the framework base 18 and top 22 are bent or angled steel members and the corner uprights 20 and the gasket support uprights 58 are tubular steel. The adjustable support bars 64 are made of bent steel and the base bottom panel is sheet metal. The side panels 14, cap 16 and gasket rests 72 are corrugated paper. It should be noted, however, that these components can be made of other suitable materials. For example, the framework 12 and gasket supports 56 could be, for example, a rigid plastic and the side panels 14, cap 16 and gasket rests 72 could be a corrugated plastic.

The components of the base 18 are welded together and the tabs 36 and 52 are welded to corner uprights 20 and the top frame 22, respectively. Similarly, the flanges 49 of the top frame 22 and the pins 64 of the gasket support uprights 58 are welded to their respective components. The corner uprights 20 and the top frame 22 components are all connected in an interference fit allowing these components to be disassembled yet provide a solid, sturdy framework 12.

The above description describes a preferred embodiment of the present invention. However, other variations not disclosed are also within the scope of the invention. For example, the adjustable support bars 64 and gasket rests 72 are optional and other materials and connections could be used. Additionally, the gasket rack 10 could include a hold-down attached to the base 18 or the gasket supports 56 to restrict the movement of the lower ends of the gaskets 17. One exemplary hold-down is a second collar and set of cross-members for each gasket support identical to those described above. In this case, the gasket support uprights would include another set of longitudinally spaced holes (in which a collar pin can engage) for height adjustment.

According, reference must be made to the following claims to determine the scope of the invention.

What is claimed is:

1. A rack for shipping and storing elongated gaskets, the rack comprising:
    a framework having a base and a top in substantially parallel planes and joined together by at least two perpendicular uprights; and
    a pair of gasket supports spaced apart in parallel planes, each gasket support having an upright extending perpendicularly from the base and a cross-member attached at a free end of the upright to be substantially parallel to the base;
    wherein the gasket supports are sized and positioned so that a gasket can be draped over the cross members so as to be supported therefrom.

2. The rack of claim 1, wherein the base has a floor so as to support portions of gaskets laying on the floor.

3. The rack of claim 1, wherein the rack can be disassembled so that the gasket supports and framework top and uprights fit within the base.

4. The rack of claim 1, wherein the gasket supports are longitudinally and laterally adjustable to accommodate various sizes of gaskets.

5. The rack of claim 4, wherein the cross-member includes a first half and a second half and each gasket support further includes a collar connected to the first and second halves of the cross-member and being sized to be slidable along the length of the upright, the collar having a fastener sized to fit within an opening in the gasket support upright for securing cross-member halves to the upright.

6. The rack of claim 5, wherein the fastener is a pin and each gasket support upright includes a plurality of openings spaced apart longitudinally and sized to receive the fastener so that the cross-member halves can be positioned at various heights.

7. The rack of claim 1, further including side panels attached to the framework and a cap fitting over the framework top for enclosing the gasket supports.

8. The rack of claim 7, wherein the framework top includes longitudinal tabs spaced and sized to fit within corresponding slits in the cap and the framework uprights include lateral and transverse tabs for retaining the side panels.

9. The rack of claim 8, wherein the cap and side panels are made of a material selected from the group consisting of corrugated paper and corrugated plastic.

10. The rack of claim 1, further including a support bar extending between the pair of gasket supports.

11. The rack of claim 10, further including a planar member resting on the support bar.

12. The rack of claim 11, wherein the planar member is flexible and drapes over the support bar and the gasket supports.

13. The rack of claim 10, wherein the support bar is adjustable having complementary members in sliding relation to each other.

14. The rack of claim 13, wherein the support bar has bent ends for fitting over the gasket support cross-members and a thumb screw for fixing the position of the complementary members.

15. The rack of claim 1, wherein the base includes upright receptors having openings sized to receive a connection end of each upright.

16. The rack of claim 15, wherein the upright receptors are located at the corners of the base.

17. The rack of claim 16, wherein the connection end is a U-channel of decreased dimension.

18. The rack of claim 1, wherein the base includes a center brace to which the gasket support uprights are connected.

19. The rack of claim 18, wherein the center brace includes a fixed upright receptor sized to receive a connection end of the upright for one of the gasket supports and wherein the other gasket support is adjustably connected to the center brace.

20. The rack of claim 19, wherein the adjustable gasket support includes a pair of pins at a bottom end disposable within a pair of a plurality of openings laterally spaced apart along the center brace.

21. The rack of claim 1, wherein the framework includes four uprights and the framework top and base have a pair of parallel lateral members and a pair of parallel transverse members joined to the uprights at their ends.

22. The rack of claim 21, wherein the longitudinal and lateral members have flanged ends sized to fit within an opening of the framework uprights.

23. The rack of claim 1, further comprising a second pair of gasket supports position laterally next to the pair of gaskets.

24. A gasket rack kit, comprising:
    at least one gasket; and
    a rack having a pair of gasket supports spaced apart in parallel planes, each gasket support having a longitudinal upright and a transverse cross-member attached at a free end of the upright, wherein the gasket supports are sized to support the at least one gasket so as to prevent deformation of the gasket during shipping and storage;
    whereby the rack can be disassembled to a more compact size when not supporting the at least one gasket.

25. A rack for supporting gaskets during shipping and storage, the rack comprising:
    a framework having a rectangular base and a rectangular top lying in substantially parallel planes and joined together at their corners by four perpendicular uprights;
    two sets of gasket supports spaced apart in parallel planes, each gasket support having an upright extending perpendicularly from the base and a cross-member attached at a free end of the upright to be substantially parallel to the base;
    support bars extending perpendicularly between the cross-members of each set of gasket supports; and
    gasket rests lying upon the support bars;
    wherein the gasket supports are sized and positioned so that a gasket can be supported at a top end and a bottom end.

26. The rack of claim 25 wherein the gasket supports and support bars are adjustable to accommodate different size gaskets.

* * * * *